United States Patent [19]
Yamane et al.

[11] Patent Number: 5,400,588
[45] Date of Patent: Mar. 28, 1995

[54] MECHANISM FOR FIRING GAS TURBINES WITH LIQUEFIED NATURAL GAS

[75] Inventors: Masami Yamane; Kazuhiko Asada; Yutaka Itoh; Shinichi Miura; Hiroo Nishimura, all of Kobe, Japan

[73] Assignee: Kabushiki Kaisha Kobe Seiko Sho, Kobe, Japan

[21] Appl. No.: 136,376

[22] Filed: Oct. 15, 1993

[30] Foreign Application Priority Data

Oct. 16, 1992 [JP] Japan .................. 4-278905
Jan. 11, 1993 [JP] Japan .................. 5-002780
Jul. 29, 1993 [JP] Japan .................. 5-188519

[51] Int. Cl.⁶ .................. F02C 3/22; F02C 7/143
[52] U.S. Cl. .................. 60/39.465; 60/728; 62/50.3; 165/146
[58] Field of Search .................. 60/39.465, 726, 728; 62/50.2, 50.3; 165/146

[56] References Cited

U.S. PATENT DOCUMENTS

| | | | |
|---|---|---|---|
| 2,718,753 | 9/1955 | Bridgeman | 60/728 |
| 3,720,057 | 3/1973 | Arenson | 60/39.465 |
| 3,788,392 | 1/1974 | Abbott et al. | 165/92 |
| 3,978,663 | 9/1976 | Mandrin et al. | 60/728 |
| 5,199,486 | 4/1993 | Balmer et al. | 165/47 |

Primary Examiner—Louis J. Casaregola
Attorney, Agent, or Firm—Oblon, Spivak, McClelland, Maier & Neustadt

[57] ABSTRACT

Disclosed herein is a method of firing a gas turbine with LNG which is designed to store the "cold" of LNG in an the LNG vaporizer. The method comprises supplying liquefied natural gas through heat exchanger tubes in the LNG vaporizer, thereby gasifying the liquefied natural gas by heat exchange with a heat transfer medium recycled through the LNG vaporizer and an air precooler, and cooling the air in the air precooler by heat exchange with the heat transfer medium cooled by the liquefied natural gas when the turbine load is high, and suspending the recycling of the heat transfer medium through the LNG vaporizer and air precooler, thereby causing the heat transfer medium to freeze on the outside of the heat exchanger tubes (for the storing of freezing latent heat) by the "cold" of the liquefied natural gas supplied, when the turbine load is low, and using the freezing latent heat (stored by the freezing of the heat transfer medium) as a "cold" source to cool air through the heat transfer medium, when the turbine load is high.

6 Claims, 9 Drawing Sheets

DISTANCE FROM THE LOWER HEADER OF THE HEAT EXCHANGER TUBE (m)

MECHANISM FOR FIRING GAS TURBINES WITH LIQUEFIED NATURAL GAS

BACKGROUND OF THE INVENTION

1. Field of the Invention

The present invention relates to a method and mechanism for firing gas turbines with liquefied natural gas for the driving of generators.

2. Description of the Prior Art

One method of thermal power generation is by gas turbines which are run by the burnt gas of combustion, and it is usually applied to power plants having a capacity up to several tens of thousand of kilowatt. There is a new method of thermal power generation which is commonly called combined power generation. This new method is based on a gas turbine and a steam turbine in combination. It offers an advantage of being started and stopped easily and permitting easy control for load variation. Moreover, it is more efficient than the ordinary steam power generation. Thus it is considered to be promising. The general trend in combined power generation is toward firing gas turbine with liquefied natural gas which is a clean fuel. The combined power generation resorting to liquefied natural gas will become more important in the countries and areas where energy demand is expected to increase in the future. Liquefied natural gas is desirable from the standpoint of stable supply in view of its huge reserves and also from the standpoint of environmental protection.

In the meantime, a gas turbine has the disadvantage of decreasing in output with the increasing atmospheric temperature. This is because an increase in atmospheric temperature decreases the density of combustion air being supplied to the gas turbine. The lower the density of air, the smaller the mass of air in the same volume. Unfortunately, the atmospheric temperature is highest in the afternoon in summer when the electric power consumption is highest for air conditioners. In other words, the output of gas turbines is lowest when the electric power consumption is highest. This prevents the effective use of combined power generation.

Figure 17:
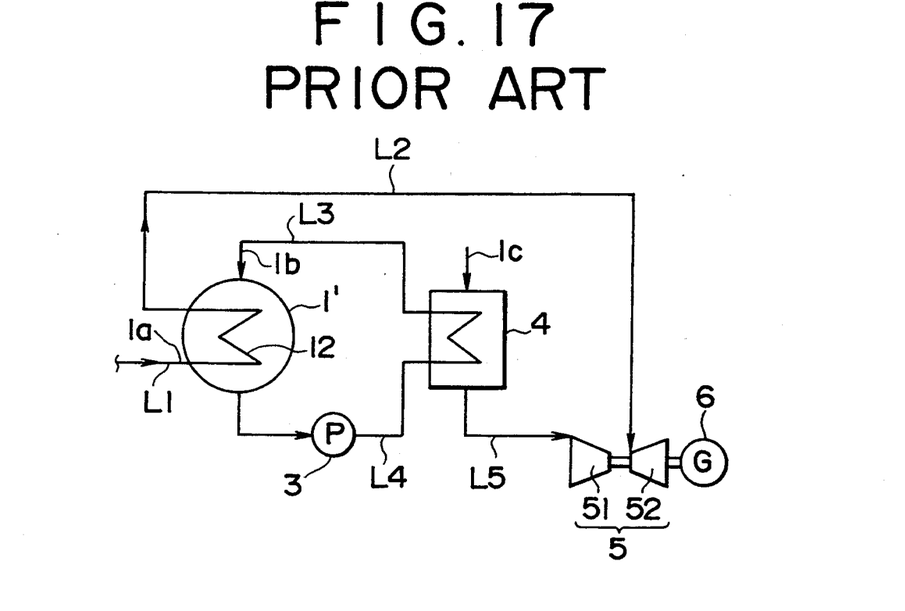
FIG. 17 is a flow sheet showing an example of the conventional system for power generation by a gas turbine.

A common practice to overcome this disadvantage is to use an air precooling system (as shown in FIG. 17) for gas turbines fired with natural gas. Liquefied natural gas (LNG) indicated by 1a is introduced into an LNG vaporizer 1' before it is supplied to a turbine 51. The LNG vaporizer 1' is provided therein with a heat exchanger tube 12. The inlet of the heat exchanger tube 12 is connected to a passage L1 through which LNG 1a is introduced from outside. The outlet of the heat exchanger tube 12 is connected to a passage L2 through which natural gas (NG) is supplied to the turbine 52. The rotation of the turbine 52 is transmitted to the generator 6.

The LNG vaporizer 1' is supplied with a heat transfer medium 1b through a passage L3. The heat transfer medium 1b heats and vaporizes LNG 1a passing through the heat exchanger tube 12. After passing through the LNG vaporizer 1' the heat transfer medium 1b is cooled by heat exchange through the heat exchanger tube 12 and discharged. The heat transfer medium 1b is recycled through passages L4 and L3 by a recycling pump 3 installed in the passage L4.

Between the passages L4 and L3 is an air precooler 4, so that heat exchange takes place between the cooled heat transfer medium and the air 1c introduced from outside. The cooled air resulting from heat exchange is introduced into an air compressor 51 of the turbine unit 5. On the other hand, the heat transfer medium 1b which has been heated as the result of heat exchange with air 1c is introduced again into the LNG vaporizer 1' for the heating of LNG 1a.

The above-mentioned system performs heat exchange between LNG 1a and air 1c by means of the heat transfer medium 1b, and the heat exchange heats and vaporizes LNG 1a and precools air 1c, increasing its density. This leads to a substantial increase in the amount of combustion air to be supplied to the turbine 52 and hence an increase in turbine output.

The general method of operating a gas turbine fired with liquefied natural gas has been explained above with reference to FIG. 17. The method and apparatus for increasing the output of the turbine 52 by cooling air 1c by heat exchange between LNG 1a and air 1c are disclosed in Japanese Patent Publication No. 2771/1984, Japanese Patent Laid-open Nos. 47625/1981 and 142219/1989, and Japanese Utility Model Laid-open Nos. 174730/1982, 41537/1985, and 186908/1988.

The prior art technologies, however, generally lack the technical idea of storing "cold" although they involve heat exchange for air cooling, except for Japanese Patent Laid-open No. 142219/1989. The method disclosed in it employs a mixture of water and ethylene glycol (antifreezing fluid) as the heat transfer medium. Storing "cold" by means of the sensible heat of the heat transfer medium alone needs a considerably large storage tank for the heat transfer medium.

The disadvantage of operating a gas turbine by firing with liquefied natural gas in the conventional manner as shown in FIG. 17 is that the cooling of air 1c by the cooling medium 1b is by far less than expected, because the amount of LNG 1a supplied to the heat exchanger tube 12 is determined by the turbine 52 and the ability of LNG 1a to cool the heat transfer medium 1b is limited. As the result, the amount (in weight) of air 1c supplied to the turbine unit 5 does not increase so much as expected, nor does the output of the turbine 52. The precooling of air 1c by heat exchange with LNG 1a in the conventional manner (as disclosed above) is not enough to operate the gas turbine to make up for power shortage when power consumption is at its peak.

Incidentally, Japanese Patent Laid-open No. 142219/1989 shown above discloses a system which has a heat accumulator (like a pool) installed in the recycling passage for the heat transfer medium, so that the heat transfer medium that has undergone heat exchange with LNG is collected in the heat accumulator and the freezing latent heat is accumulated therein. The thus accumulated "cold" can be used to cool air when the turbine load is high. Therefore, this system is superior to those in other disclosures. This system, however, has the disadvantage of using as the heat transfer medium a mixture of water and ethylene glycol (antifreezing fluid) and resorting to "cold" accumulation by means of the sensible heat of the heat transfer medium (which is apparent from the use of antifreezing fluid). Therefore, a considerably large storing tank is required to store "cold" by cooling the heat transfer medium stored in the heat accumulator like a pool.

In the meantime, Japanese Patent Laid-open No. 142219/1989 mentions that the storing of "cold" in the form of ice is effective. However, it is impossible that the heat transfer medium freezes in the heat accumulator, because the heat accumulator is installed outside the LNG vaporizer to cool the heat transfer medium and the cooled heat transfer medium is introduced into the heat accumulator through the piping. This means that the heat transfer medium is transferred in the unfrozen state and the heat transfer medium increases in temperature during transportation due to heat supplied from the atmosphere. It is concluded that storing "cold" in the form of ice is unrealistic.

The present invention was completed to address the above-mentioned problems. Accordingly, it is an object of the present invention to provide a method for effectively operating a gas turbine by firing with liquefied natural gas. The object is achieved by effectively storing "cold" for the heat transfer medium to cool air.

SUMMARY OF THE INVENTION

The first aspect of the present invention resides in an improved method of firing a gas turbine with liquefied natural gas by gasifying liquefied natural gas in an LNG vaporizer, burning the gasified natural gas with combustion air cooled by an air precooler, and driving the gas turbine by means of the combustion gas, wherein said improvement comprises supplying liquefied natural gas through heat exchanger tubes in said LNG vaporizer, thereby gasifying the liquefied natural gas by heat exchange with a heat transfer medium recycled through the LNG vaporizer and air precooler, and cooling the air in the air precooler by heat exchange with the heat transfer medium cooled by the liquefied natural gas when the turbine load is high, and suspending the recycling of the heat transfer medium through the LNG vaporizer and air precooler, thereby causing the heat transfer medium to freeze on the outside of the heat exchanger tubes (for the storing of freezing latent heat) by the "cold" of the liquefied natural gas supplied, when the turbine load is low, and using the freezing latent heat (stored by the freezing of the heat transfer medium) as a "cold" source to cool air through the heat transfer medium, when the turbine load is high.

The second aspect of the present invention resides in the method of firing a gas turbine with liquefied natural gas as defined in the first aspect, wherein the heat transfer medium is water.

The third aspect of the present invention resides in the method of firing a gas turbine with liquefied natural gas as defined in the first or second aspect, wherein the LNG vaporizer is one in which the heat exchanger tubes are provided at their upstream with heat insulation.

The fourth aspect of the present invention resides in the method of firing a gas turbine with liquefied natural gas as defined in the third aspect, wherein the heat insulation is a polytetrafluoroethylene coating film formed on the heat exchanger tubes.

The fifth aspect of the present invention resides in the method of firing a gas turbine with liquefied natural gas as defined in the third aspect, wherein the heat insulation of the heat exchanger tubes at their upstream is accomplished by double-tube structure, with the space between the inner and outer tubes sealed airtightly.

The sixth aspect of the present invention resides in the method of firing a gas turbine with liquefied natural gas as defined in the third aspect, wherein the heat insulation of the heat exchanger tubes at their upstream is accomplished by double-tube structure, with the space between the inner and outer tubes communicating with the inner tube at the upstream.

The seventh aspect of the present invention resides in the method of firing a gas turbine with liquefied natural gas as defined in the first, second, or third aspect, wherein the LNG vaporizer is one in which the heat exchanger tubes are arranged zigzag upward from the bottom of the vaporizer, with their zigzag intervals gradually decreasing in going upward in proportion to the thickness of ice formed thereon.

The eighth aspect of the present invention resides in an improved mechanism for firing a gas turbine with liquefied natural gas by gasifying liquefied natural gas in an LNG vaporizer, burning the gasified natural gas with combustion air cooled by an air precooler, and driving the gas turbine by means of the combustion gas, wherein said improvement comprises a tank holding a heat transfer medium, heat exchanger tubes which are arranged in said tank so that the heat transfer medium passes through them, an LNG vaporizer having an inlet and outlet for the heat transfer medium and an inlet and outlet for the gasified natural gas, an air precooler to cool air through heat exchange between air and said heat transfer medium, a passage for the heat transfer medium which is formed between the air precooler and the LNG vaporizer by connecting the heat transfer medium inlet of the air precooler to the heat transfer medium outlet of the LNG vaporizer and connecting the heat transfer medium outlet of the air precooler to the heat transfer medium inlet of the LNG vaporizer, and a means to open and close the heat transfer medium passage as desired.

The ninth aspect of the present invention resides in the mechanism for firing a gas turbine with liquefied natural gas as defined in the eighth aspect, wherein the heat transfer medium is water.

The tenth aspect of the present invention resides in the mechanism for firing a gas turbine with liquefied natural gas as defined in the eighth or ninth aspect, wherein the heat exchanger tubes are provided at their upstream with heat insulation.

The eleventh aspect of the present invention resides in the mechanism for firing a gas turbine with liquefied natural gas as defined in the tenth aspect, wherein the heat insulation is a polytetrafluoroethylene coating film formed on the heat exchanger tubes.

The twelfth aspect of the present invention resides in the mechanism for firing a gas turbine with liquefied natural gas as defined in the tenth aspect, wherein the heat insulation of the heat exchanger tubes at their upstream is accomplished by double-tube structure, with the space between the inner and outer tubes sealed airtightly.

The thirteenth aspect of the present invention resides in the mechanism for firing a gas turbine with liquefied natural gas as defined in the tenth aspect, wherein the heat insulation of the heat exchanger tubes at their upstream is accomplished by double-tube structure, with the space between the inner and outer tubes communicating with the inner tube at the upstream.

The fourteenth aspect of the present invention resides in the mechanism for firing a gas turbine with liquefied natural gas as defined in the eighth, ninth, or tenth aspect, wherein the LNG vaporizer is one in which the heat exchanger tubes are arranged zigzag upward from the bottom of the vaporizer, with their zigzag intervals gradually decreasing in going upward in proportion to the thickness of ice formed thereon.

DETAILED DESCRIPTION OF THE INVENTION

The method and mechanism for firing a gas turbine with liquefied natural gas are defined respectively in the first and eighth aspects of the present invention. They are designed such that the storing of "cold" by the icing of the heat transfer medium takes place on the surface of the heat exchanger tubes through which liquefied natural gas is transferred. As the result, the "cold" possessed by liquefied natural gas is very efficiently stored in the form of freezing latent heat by the icing of the heat transfer medium on the surface of the heat exchanger tubes. This leads to a greater "cold" storage capacity than the conventional one which resorts to the sensible heat of the heat accumulating material. The stored "cold" is large enough to sufficiently cool combustion air when the turbine load is high. This permits the gas turbine to be operated efficiently according to the load which varies from time to time.

The method and mechanism for firing a gas turbine with liquefied natural gas are also defined respectively in the second and ninth aspects of the present invention. They employ water as the heat transfer medium. This permits the heat transfer medium to circulate even when it freezes on the surface of the heat exchanger tubes. The temperature of the circulating heat transfer medium is higher than 0° C. This prevents the frosting in the air precooler.

The method and mechanism for firing a gas turbine with liquefied natural gas are also defined respectively in the third and tenth aspects of the present invention. They are characterized by that the heat exchanger tubes are provided at their upstream with heat insulation. When liquefied natural gas is introduced into the heat exchanger tubes for heat exchange with the heat transfer medium flowing outside the heat exchanger tubes, the heat exchange gasifies the liquefied natural gas and cools the heat transfer medium, and the cooled heat transfer medium partly forms ice on the surface of the heat exchanger tubes. However, the heat insulation prevents ice from growing on the heat exchanger tubes at their upstream which is most liable to icing. The result is that icing on the entire heat exchanger tubes is more even than if the heat exchanger tubes are not provided with heat insulation. This avoids the situation in which ice is formed thick locally on the heat exchanger tubes, with the space between the heat exchanger tubes clogged. The even icing permits the heat transfer medium to pass through the space between the heat exchanger tubes. This makes it possible to reduce the space between the heat exchanger tubes. Uniform icing instead of local excess icing on the heat exchanger tubes increases the overall icing capacity. This permits the operation of a gas turbine in such a way that the heat transfer medium is not recycled at night (when the turbine load is low) so as to form ice on the heat exchanger tubes and the heat transfer medium is recycled in daytime (when the turbine load is high) so as to utilize the latent heat of the ice. In this way it is possible to increase the air cooling capacity of the heat transfer medium. Operation in the above-mentioned way increases the amount of air to be supplied to the turbine and hence increases the output of the turbine. This leads to an increase in power generation.

The method and mechanism for firing a gas turbine with liquefied natural gas are also defined respectively in the fourth and eleventh aspects of the present invention. They are characterized by that the heat exchanger tubes are provided at their upstream with a layer of polytetrafluoroethylene for heat insulation. It produces a good heat insulating effect and reduces icing on the heat exchanger tubes. In addition, it can be easily formed.

The method and mechanism for firing a gas turbine with liquefied natural gas are also defined respectively in the fifth and twelfth aspects of the present invention. They are characterized by that the heat exchanger tubes at their upstream are of double wall structure consisting of an inner tube and outer tube. This double structure, with the space between the inner and outer tubes sealed airtightly, functions as heat insulation owing to the gas enclosed therein.

The method and mechanism for firing a gas turbine with liquefied natural gas are also defined respectively in the sixth and thirteenth aspects of the present invention. They are characterized by that the heat exchanger tubes at their upstream are of double wall structure consisting of an inner tube and outer tube. This double wall structure, with the space between the inner and outer tubes communicating with the inner tube at the upstream, functions as heat insulation, because liquefied gas caught in this space does not escape from the space but becomes gasified there by heat from the heat transfer medium and stays there in the form of gas. This natural gas produces a good heat insulating effect.

The method and mechanism for firing a gas turbine with liquefied natural gas are also defined respectively in the seventh and fourteenth aspects of the present invention. They are characterized by that the heat exchanger tubes in the LNG vaporizer are arranged zigzag upward from the bottom such that their zigzag intervals decrease in going up in proportion to the thickness of ice formed on the heat exchanger tubes. The consequence of such arrangement is that there are larger spaces (for the passage of the heat transfer medium) between the heat exchanger tubes at their lower part on which a larger amount of ice is formed, and the upper part of the heat exchanger tubes with narrow intervals permits the LNG vaporizer to be constructed small.

EXAMPLES

Figure 1:
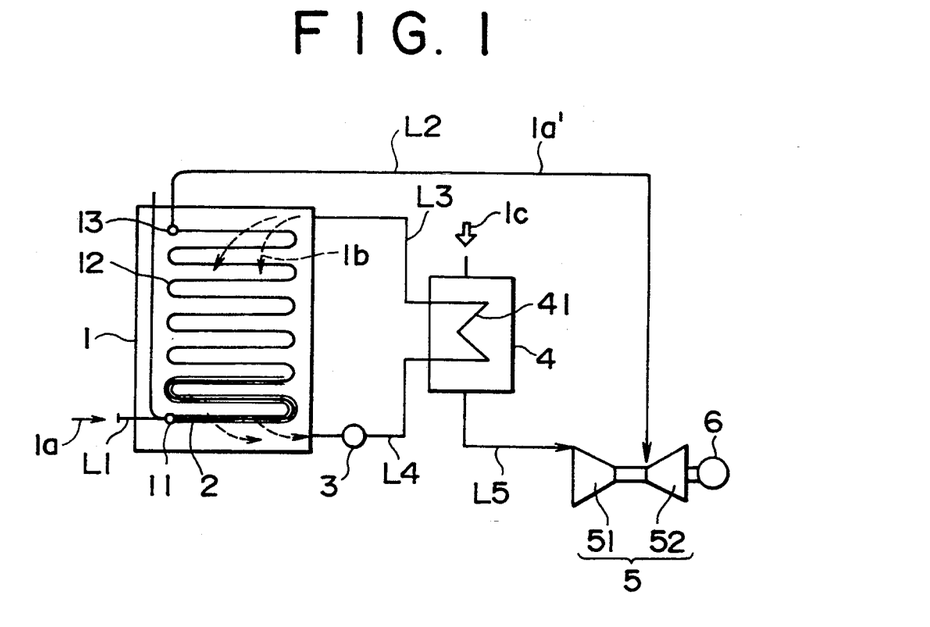
FIG. 1 is a flow sheet showing an example of the system for power generation by a gas turbine to which the present invention is applied.
Figure 2:
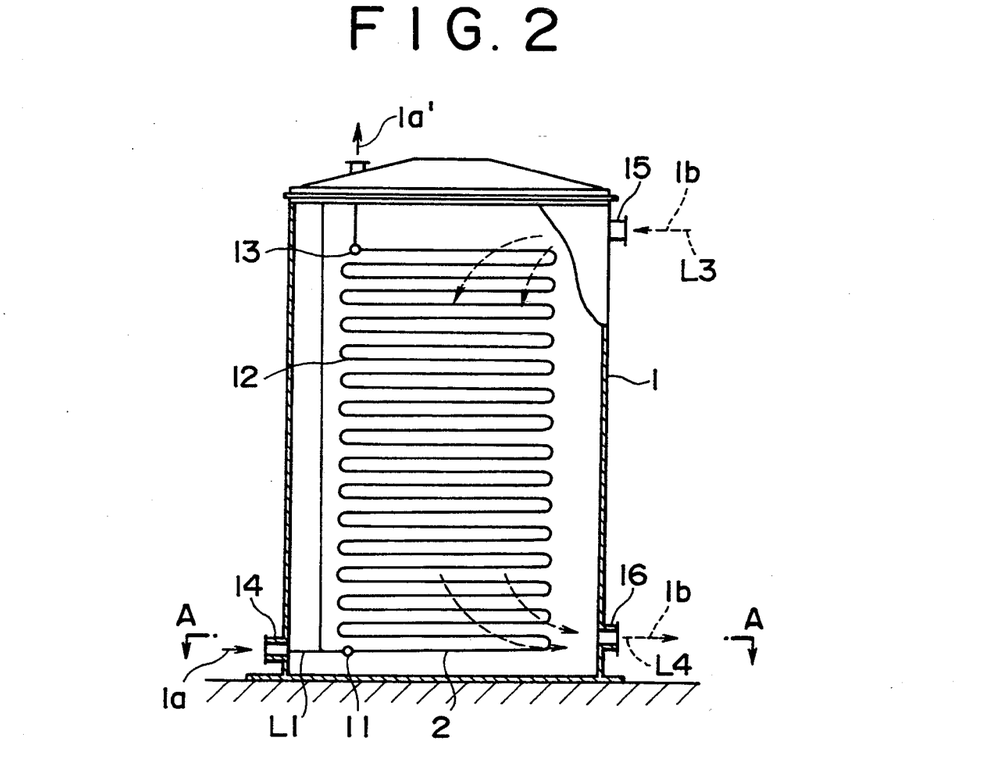
FIG. 2 is a schematic sectional side view showing an example of the vaporizer pertaining to the present invention.
Figure 3:
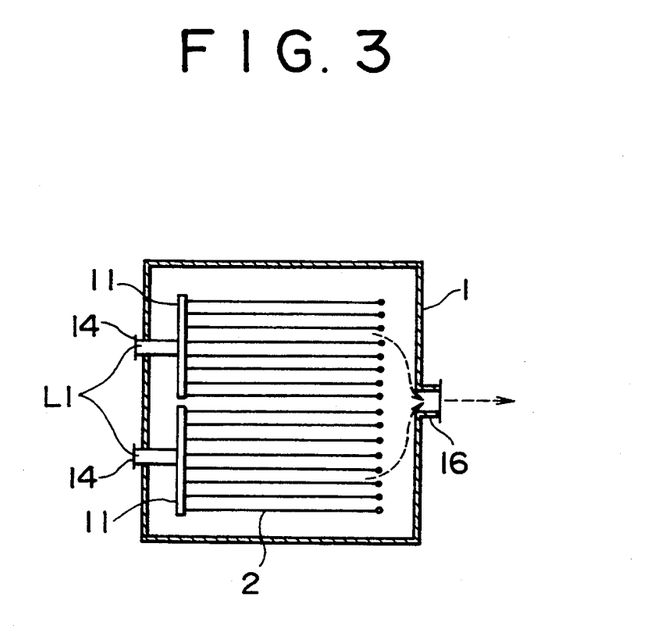
FIG. 3 is a sectional view taken along the line A—A in FIG. 2.

The invention will be described with reference to the accompanying drawings. FIG. 1 is a flow sheet showing an example of the system for power generation by a gas turbine to which the present invention is applied. FIG. 2 is a schematic sectional side view showing an example of the vaporizer pertaining to the present invention. FIG. 3 is a sectional view taken along the line A—A in FIG. 2.

The power generation system shown in FIG. 1 is constructed of an LNG vaporizer 1 as an heat exchanger (to gasify liquefied natural gas (LNG) 1a into natural gas (NG) 1a'), an air precooler 4 to cool combustion air 1c, and a turbine unit 5 (consisting of an air compressor 51 to compress precooled combustion air 1c and NG 1a' and a turbine 52).

The LNG vaporizer 1 has an LNG inlet 14, as shown in FIG. 2. The LNG inlet 14 is connected to a passage L1 extending into the LNG vaporizer 1. The end of the passage L1 is connected to a horizontal lower header 11. From the lower header 11 are branched horizontally a plurality of parallel heat exchanger tubes 12, as shown in FIG. 3. The heat exchanger tubes 12 extend upward zigzag and converge at an upper header 13, as shown in FIG. 1. The upper header 13 is connected to one end of the passage L2 leading to the turbine 52.

The LNG vaporizer 1 is provided at its upper side with an inlet 15 for the heat transfer medium 1b and is also provided at its lower side with an outlet 16 for the heat transfer medium 1b, as shown in FIG. 2. To the heat transfer medium inlet 15 is connected a passage L3, and to the heat transfer medium outlet 16 is connected a passage L4. These passages L3 and L4 join in the air precooler 4, forming the heat exchange section 41. The passage L3, the inside of the LNG vaporizer, the passage L4, and the heat exchange section 41 constitute the heat transfer medium recycling path.

Upon entering the air precooler 4, combustion air 1c undergoes heat exchange with the heat transfer medium 1b passing through the heat exchange section 41 and then enters the air compressor 51 of the turbine unit 5 through the passage L5. After compression to a prescribed pressure by the air compressor 51, compressed air enters the turbine 52 for the combustion of NG 1a' fed through the passage L2. The heat exchanger tubes 12 are provided at their upstream with heat insulation part 2, as shown in FIG. 1. (The length of the zigzag heat insulation part 2 is about one-fifth to one-fourth of the entire length of the heat exchanger tubes 12 branching from the lower header 11.)

The heat exchanger tubes 12 running zigzag upward in the LNG vaporizer 1 gradually decrease in their zigzag interval in going upward in proportion to the thickness of ice formed thereon. The upper ends of the heat exchanger tubes 12 are connected to the horizontal upper header 13 placed in the upper part of the LNG vaporizer 1. The upper header 13 is connected to the passage L2.

Figure 4:
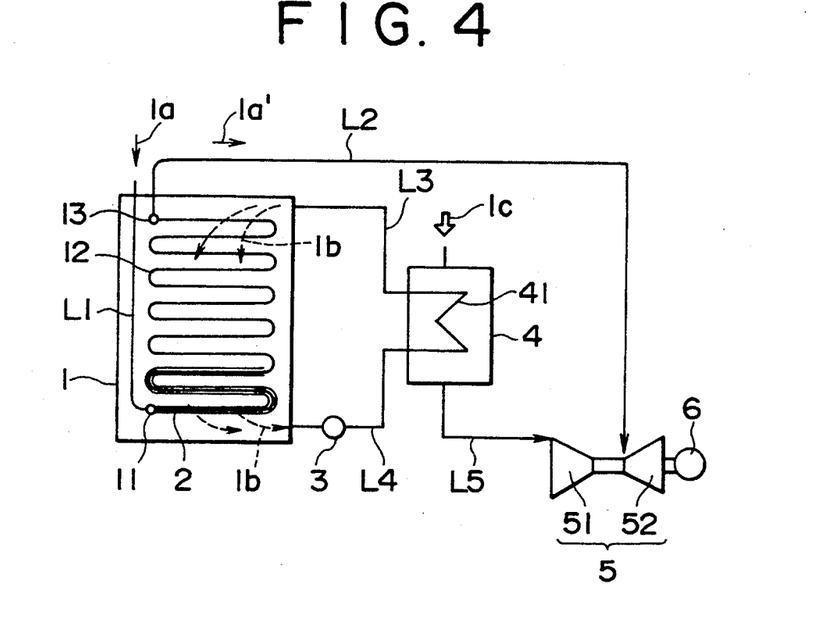
FIG. 4 is a flow sheet of another example of the system for power generation by a gas turbine to which the present invention is applied.
Figure 5:
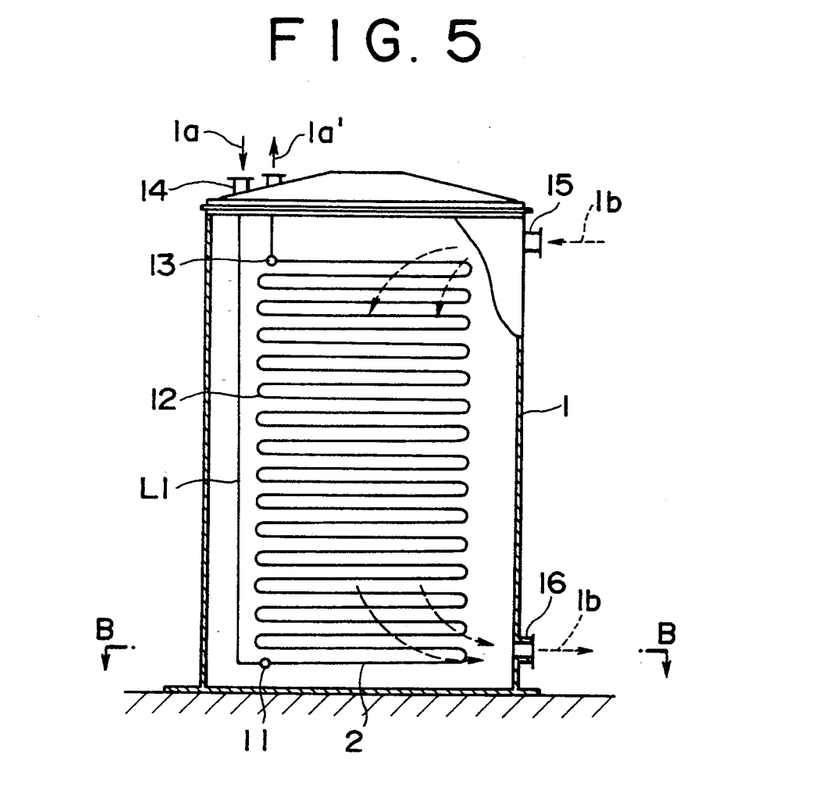
FIG. 5 is a schematic sectional side view showing another example of the vaporizer pertaining to the present invention.
Figure 6:
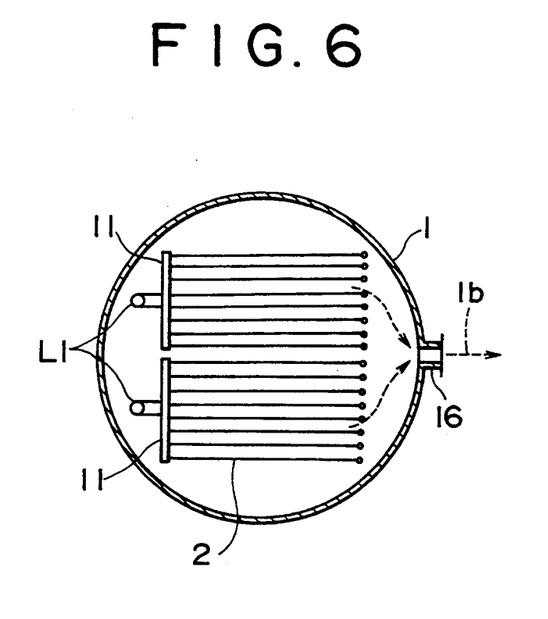
FIG. 6 is a sectional view taken along the line B—B in FIG. 5.

FIG. 4 is a flow sheet showing another example of the gas turbine power generation system. FIG. 5 is a schematic sectional side view showing the vaporizer used in the system. FIG. 6 is a sectional view taken along the line B—B in FIG. 5. This system is basically the same as that shown above in FIGS. 1 to 3, except that the LNG inlet 14 is at the top of the LNG vaporizer 1 so that LNG 1a flows downward in the LNG vaporizer 1, the heat exchanger tubes 12 are arranged zigzag at equal intervals, and the LNG vaporizer 1 is cylindrical. Which to select depends on the plant layout and other conditions.

The marked feature of the present invention resides in storing "cold" by causing the heat transfer medium 1b to freeze on the surface of the heat exchanger tubes 12 in the LNG vaporizer 1. This feature permits the effective use of "cold" and the efficient operation of a gas turbine. In other words, when the turbine load is high, the system works in such a way that the heat transfer medium 1b gasifies the liquefied natural gas 1a introduced into the heat exchanger tube 12 and the heat transfer medium 1b (which has been cooled by liquefied natural gas 1a) then cools air introduced into the air precooler 4. When the turbine load is low, the system works in such a way that the circulation of the heat transfer medium 1b through the LNG vaporizer 1 and the air precooler 4 is suspended so that the heat transfer medium 1b freezes on the surface of the heat exchanger tubes 12 due to "cold" of the liquefied natural gas 1a supplied. The frozen heat transfer medium 1b stores the freezing latent heat, which is utilized later to cool air when the turbine load is high.

Figure 7:
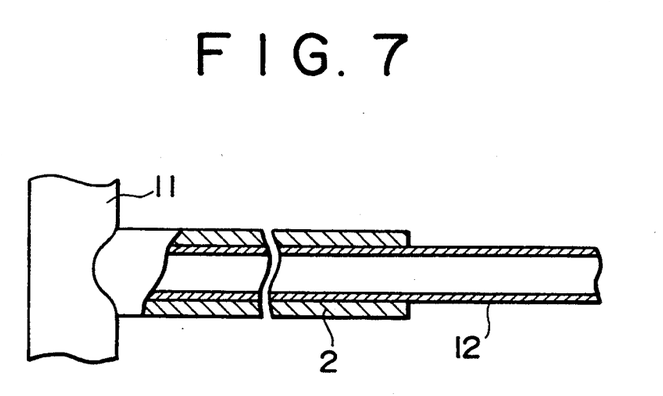
FIG. 7 is a partly cut-away plan view showing an example of the heating tubes provided with heat insulation.

The storing of "cold" by freezing is explained below. FIG. 7 is a partly cut-away plan view showing an example of the heat exchanger tube 12 which is provided with heat insulation part 2 at its lower end part. The heat insulation part 2 is a coating film of polytetrafluoroethylene (PTFE layer 2a) formed on the surface of the heat exchanger tube 12.

The heat exchanger tubes 12 in this example are specified as follows:
Material: stainless steel
Inside diameter: 25.4 mm
Wall thickness: 2 mm
Overall length: 170 m The long heat exchanger tubes 12 are folded back 31 times (in a zigzag pattern) in the LNG vaporizer 1, as shown in FIG. 2. In the case shown in FIG. 5, the heat exchanger tubes are folded back 29 times. Each of the heat exchanger tubes 12 is covered with the PTFE coating layer 2a over its length of 36 m from its lower end. The PTFE layer 2a is 5 mm thick. In this example, the PTFE layer 2a is used for heat insulation part 2; however, it may be replaced by any other suitable heat insulating material. Each of the heat exchanger tubes 12 as specified above permits LNG 1a to flow at a rate of 390 kg/h. The flow rate of the heat transfer medium 1b (water) is established at 25 t/h.

When the gas turbine is in operation, LNG 1a is introduced into the LNG vaporizer 1 through the passage L1 and gasified by the heat transfer medium 1b introduced into the LNG vaporizer 1 through the passage L3. The gasified NG 1a' is supplied to the turbine 52 through the passage L2.

In the LNG vaporizer 1, the heat exchanger tubes 12 branch off from the lower header 11. This construction offers the advantage that the high pressure of LNG 1a is shared among the heat exchanger tubes 12 unlike the conventional shell and tube heat exchanger in which the pressure is supported by the flat tubesheet. Therefore, the heat exchanger tubes 12 need not be of high-pressure type. They may be thin accordingly, and this contributes to good heat conduction and low cost.

The heat transfer medium introduced into the LNG vaporizer 1 is cooled by LNG 1a. It is then introduced into the heat exchange section 41 of the air precooler 4 through the passage L4 by the recycling pump 3 installed therein. In the air precooler 4, air 1c is cooled by the heat transfer medium 1b passing through the heat exchange section 41. The cooled air 1c is introduced into the air compressor 51 of the turbine unit .5. The air is compressed by the compressor 51 and the compressed air is introduced, together with NG 1a', into the turbine 52. They produce the combustion gas to drive the turbine 52, which in turn drives the generator 6.

Figure 9:
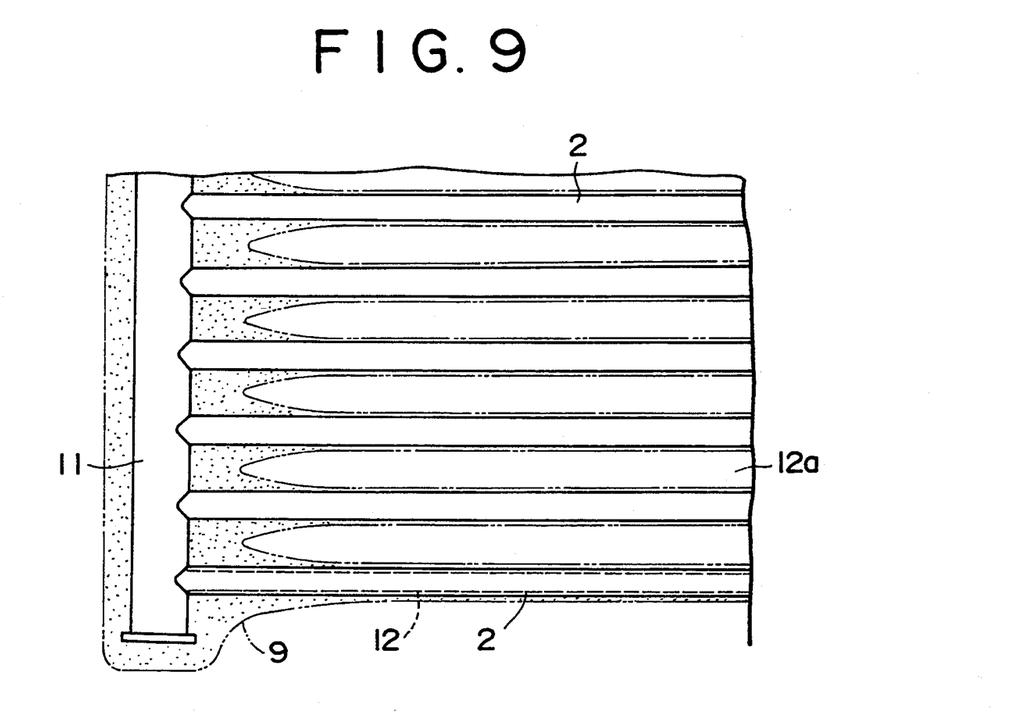
FIG. 9 is a plan view showing how ice is formed on the heat exchanger tubes provided with heat insulation.

Each of the heat exchanger tubes 12 branching off from the lower header 11 in the LNG vaporizer is partly provided with the PTFE layer 2a as the heat insulation part 2 (over about one-fourth the entire length). The PTFE layer 2a reduces the amount of "cold" moving from the LNG 1a to the heat transfer medium 1b. The consequence is that the amount of ice 9 formed on the surface of the heat exchanger tubes is limited to such an extent that there is a space 12a for the heat transfer medium 1b to pass through, as shown in FIG. 9. Although ice is formed on that part of the heat exchanger tube 12 which is not provided with the PTFE layer 2a, its amount (or thickness) is not so great because LNG 1a has a considerably increased temperature when it reaches the uninsulated part of the heat exchanger tube because it undergoes some heat exchange while it passes through the insulated part of the heat exchanger tube.

In short, the heat insulation part 2 with the PTFE layer 2a formed on the heat exchanger tubes 12 at their upstream causes uniform icing along the length of the heat exchanger tubes 12. This prevents the local forming of ice on the heat exchanger tubes 12 which would clog the space 12a between them.

Figure 8:
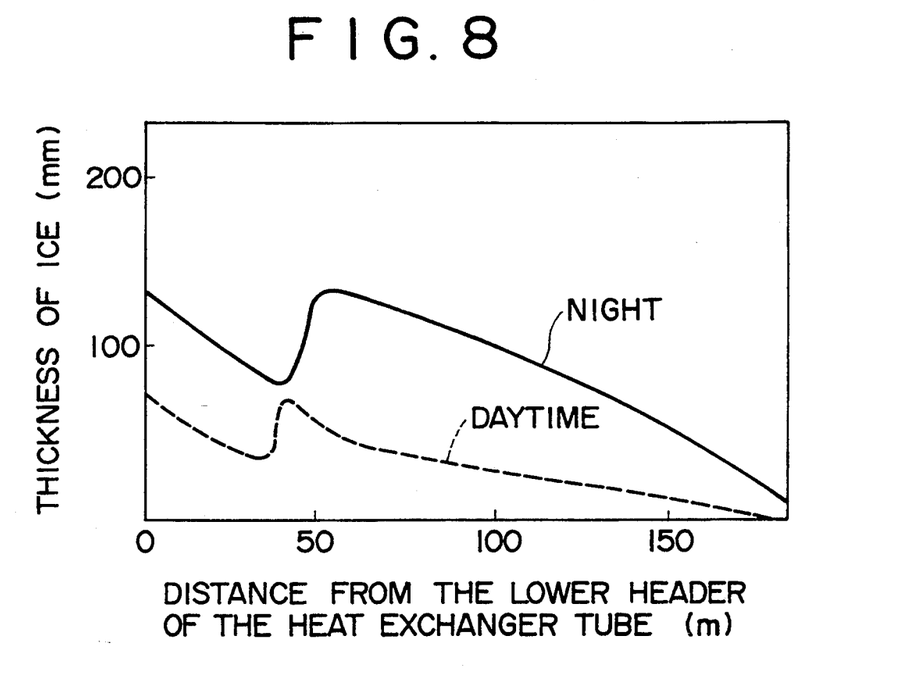
FIG. 8 is a graph showing the relationship between the thickness of ice and the length from the base end of the heat exchanger tubes provided with heat insulation.

The foregoing is graphically proven in FIG. 8 by plotting the thickness of ice against the distance along the length of the heat exchanger tubes from the lower header. (That part of the heat exchanger close to the lower header is provided with heat insulation.) This result was obtained from operation using the heat exchanger tubes and the flow rate of LNG 1a and heat transfer medium 1b which were specified above.

Figure 11:
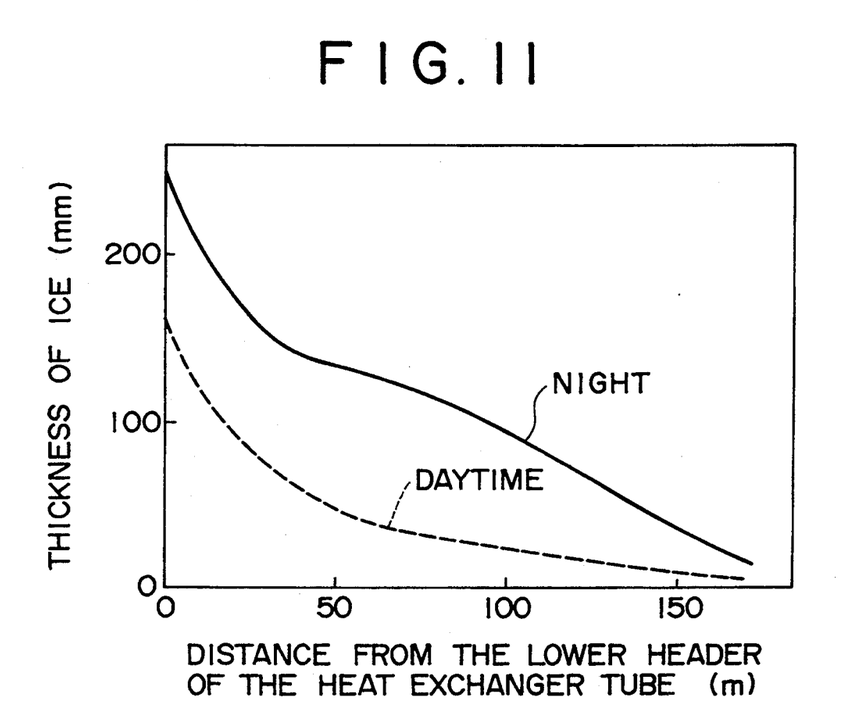
FIG. 11 is a graph showing the relationship between the thickness of ice and the length from the base end of the heat exchanger tubes having no heat insulation.

The dashed line represents the state of icing which was observed during operation for 6.5 hours in daytime, with the heat transfer medium 1b fed to the LNG vaporizer at a flow rate of 25 t/h. It is noted that the thickness of ice formed on the heat exchanger tubes 12 over their length of 36 m from their base end is small owing to the PTFE layer 2a. The thickness of ice formed on the uninsulated part of the heat exchanger tubes 12 steeply increases; nevertheless, it is limited to less than 100 mm. The solid line represents the state of icing which was observed during operation for 17.5 hours at night, with the heat transfer medium 1b not circulated. The thickness of ice is much larger than that in daytime operation. Nevertheless, the maximum thickness is about 130 mm, which is about one half of the maximum thickness (about 240 mm) in the case where the heat exchanger tubes are not coated with the PTFE layer 2a, as shown in FIG. 11.

The present invention is based on the fact that it is possible to produce electric power sufficiently at night (when power consumption is low) without cooling the combustion air 1c to a great extent. The basic technical idea of the present invention lies in operating the turbine, with the circulating pump 3 suspended or slowed down and the circulation of air 1c suspended or reduced at night. In this operation mode, the turbine unit 5 is fed with air 1c which is not precooled or only slightly precooled, and the heat transfer medium 1b staying in the LNG vaporizer is caused to freeze on the heat exchanger tubes 12. The freezing stores "cold". The stored "cold" is released by resuming the circulating pump 3 in daytime when the power consumption increases. The released "cold" adds to the cooling power of the heat transfer medium 1b, so that air 1c is precooled to a sufficiently low temperature.

Therefore, the present invention is not limited to forming the heat insulation part 2 on the heat exchanger tubes 12. The following is concerned about the system in which the heat exchanger tubes 12 are not provided with the heat insulation part 2.

Figure 10:
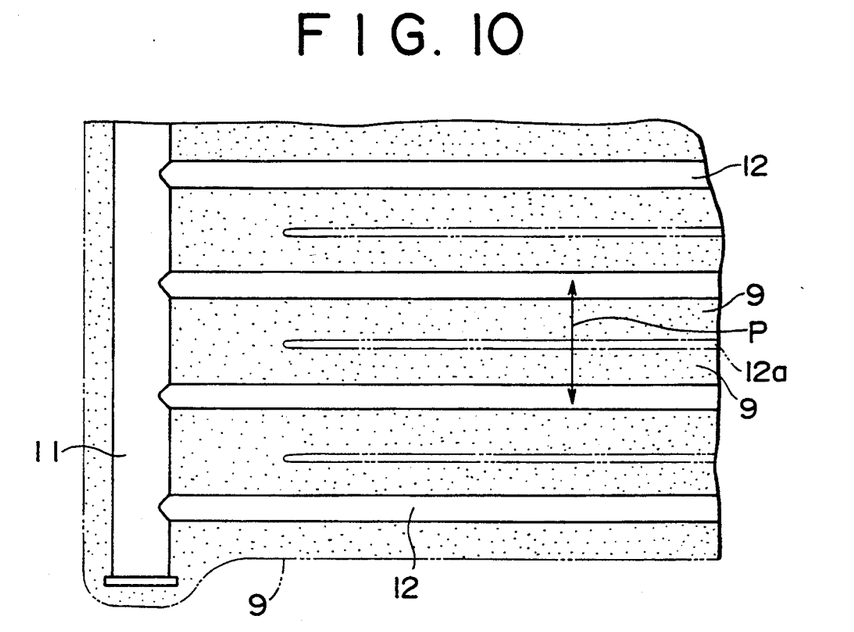
FIG. 10 is a plan view showing how ice is formed on the heat exchanger tubes having no heat insulation.

As shown in FIG. 9, ice 9 is formed first on the part where the heat exchanger tubes 12 branch off from the lower header 11 which is cooled most by LNG 1a. Thus, the thickness of ice is greatest there, and it gradually decreases in going downstream. Therefore, there is a sufficient space for the heat transfer medium 1b to pass through between the heat exchanger tubes 12. While the circulation of the heat transfer medium 1b is suspended for about 17 hours at night, ice 9 grows on the heat exchanger tubes 12 to such an extent that only a small space 12a is left between the heat exchanger tubes 12 at dawn as shown in FIG. 10. This is quantitatively illustrated in FIG. 11 by plotting the thickness of ice against the length of the heat exchanger tubes from their end. The dashed line represents the state of icing in daytime which exists while the heat transfer medium 1b is circulated. The solid line represents the state of icing which exists at night (for 17.5 hours) while the circulation of the heat transfer medium 1b is suspended. Incidentally, the heat exchanger tubes 12 are made of stainless steel and have an inside diameter of 25.4 mm and a wall thickness of 2 mm, and the heat transfer medium 1b is water. The flow rate of LNG 1a is 390 kg/h for each of the heat exchanger tubes 12 throughout the day. The flow rate of the heat transfer medium 1b is 25 t/h in daytime (for 6.5 hours).

It is noted from FIG. 11 that in daytime the thickness of ice 9 is about 150 mm near the base end of the heat exchanger tubes 12 and it decreases steeply in going downstream. Therefore, there is a sufficient space 12a between the heat exchanger tubes 12 and the flow of the heat transfer medium 1b is not interrupted. However, as the solid line indicates, ice 9 on the heat exchanger tubes 12 grows at night while the circulation of the heat transfer medium 1b is suspended. Thus the thickness of ice at the base end of the heat exchanger tubes 12 is about 240 mm. By contrast, the thickness of ice at the downstream of the heat exchanger tubes 12 is considerably small. This suggests that the intervals P of the heat exchanger tubes 12 should be increased in the case where the heat insulation part 2 is not formed near the base end of the heat exchanger tubes 12.

Assuming the state of icing mentioned above, the following circulations are made for the intervals P between the heat exchanger tubes 12 that permit the heat transfer medium 1b to flow smoothly through the space 12a between the heat exchanger tubes 12. [(Maximum thickness of ice)× 2]+(Outside diameter of the heat exchanger tube) =240 mm×2+25.8 mm=505.8 mm In practice, it is possible to increase the intervals P easily as shown above by arranging zigzag the base end part (about 10–20 m long) of the heat exchanger tubes 12.

The space 12a between the heat exchanger tubes 12 will not be clogged by ice 9 at night and hence it is possible to start immediately the circulation of the heat transfer medium 1b for daytime operation, if the heat insulation part 2 is formed near the base end of the heat exchanger tubes 12 in the case where the intervals P of the heat exchanger tubes 12 are kept constant, or if the intervals P between the heat exchanger tubes 12 is increased near their base end in the case where the heat insulation part 2 is not formed.

Decreasing the intervals between the heat exchanger tubes 12 produces the effect which is explained below. FIG. 11 shows the relationship between the thickness of ice and the distance from the lower header 11 for the heat exchanger tubes 12, in the case where the heat insulation part 2 is not formed on the heat exchanger tubes 12. The dashed line represents the state of icing which exists in daytime when the heat transfer medium 1b is being circulated. The solid line represents the state of icing which exists at night (for 17.5 hours) when the circulation of the heat transfer medium 1b is suspended. Incidentally, the heat exchanger tubes 12 are made of stainless steel and have an inside diameter of 25.4 mm and a wall thickness of 2 mm. The heat transfer medium 1b is water. The flow rate of LNG 1a is 390 kg/h for each of the heat exchanger tubes 12 throughout a day. The flow rate of the heat transfer medium 1b is 25 t/h in daytime (for 6.5 hours).

It is noted from FIG. 11 that in daytime the thickness of ice 9 is about 150 mm near the base end of the heat exchanger tubes 12 and it decreases steeply in going downstream. Therefore, there is a sufficient space 12a between the heat exchanger tubes 12 and the flow of the heat transfer medium 1b is not interrupted. However, as the solid line indicates, ice 9 on the heat exchanger tubes 12 grows at night while the circulation of the heat transfer medium 1b is suspended. Thus the thickness of ice at the base end of the heat exchanger tubes 12 is about 240 mm. Therefore, the heat exchanger tubes 12 are arranged zigzag upward in the LNG vaporizer as shown in FIG. 1 in such a way that the intervals between the heat exchanger tubes 12 are gradually decreased in going upward.

Figure 12:
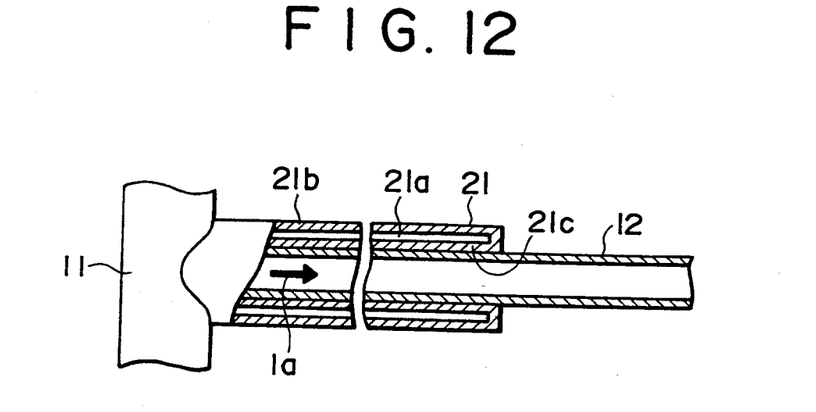
FIG. 12 is a partly cut-away plan view showing another example of the heat exchanger tubes provided with heat insulation.

FIG. 12 is a partly cut-away plan view showing the heat-insulated heat exchanger tube in another example. In this case, the heat insulation is accomplished by the double-tube structure near the upstream which consists of an outer tube 21b and an inner tube 21c. The space 21a formed between the outer tube 21b and the inner tube 21c is sealed airtightly. It may be evacuated, but it is usually filled with nitrogen gas (or air) for effective heat insulation.

Figure 13:
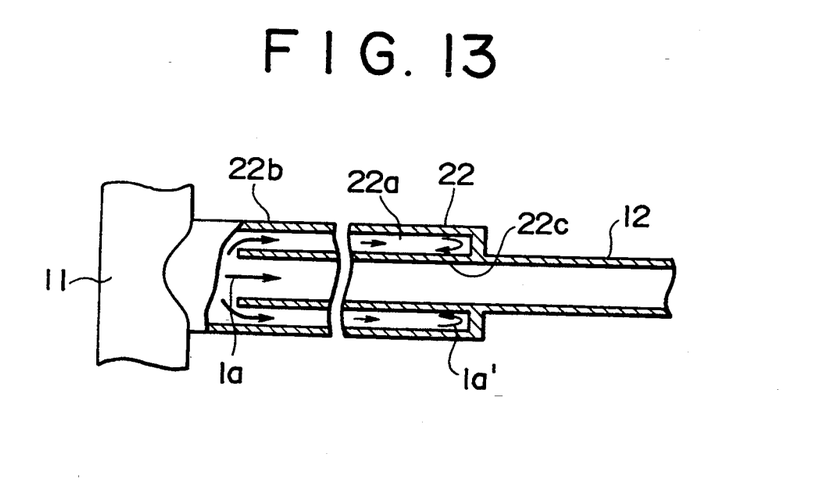
FIG. 13 is a partly cut-away plan view showing further another example of the heat exchanger tubes provided with heat insulation.

FIG. 13 is a partly cut-away plan view showing the heat-insulated heat exchanger tube in another example. In this case, the heat insulation is accomplished by the double-tube structure near the upstream which consists of an outer tube 22b and an inner tube 22c, as in the case mentioned above. However, the space 22a formed between the outer tube 22b and the inner tube 22c is communicating with the heat exchanger tube 12 at the upstream base end. LNG 1a introduced into the heat exchanger tube 12 from the lower header 11 partly enters the space 22a to be gasified by the heat transfer medium 1b. The gasified NG 1a' stays there to produce the heat insulating effect. In this way the double-walled tube 22 functions as the heat insulation part 2.

Figure 14:
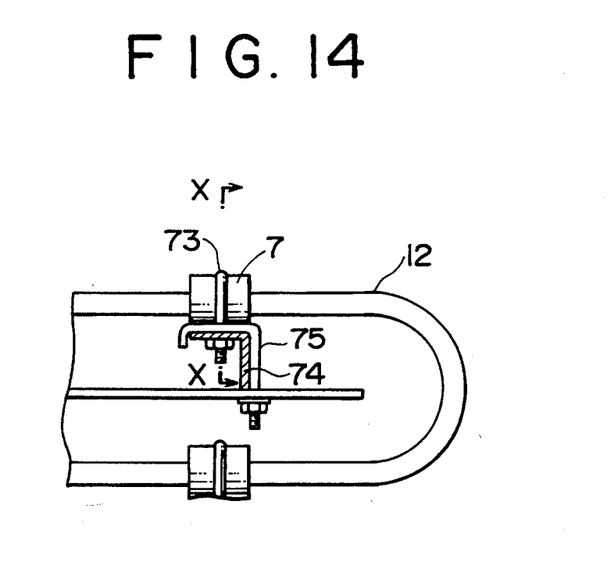
FIG. 14 is a partial side view showing how the heat exchanger tube is supported in the LNG vaporizer.
Figure 15:
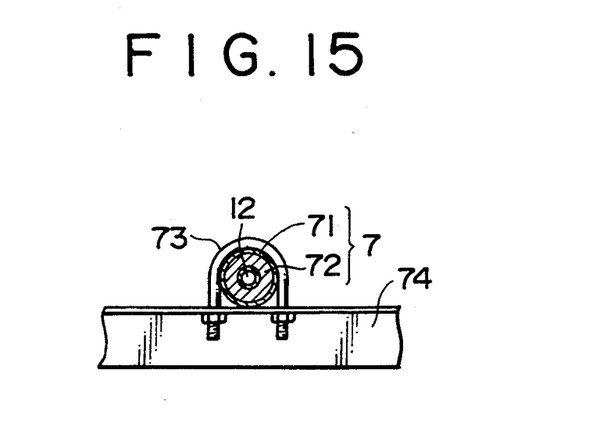
FIG. 15 is a sectional view taken along the line X—X in FIG. 14.

FIG. 14 is a partial side view showing the supporting structure for the heat exchanger tube 12 in the LNG vaporizer 1. FIG. 15 is a sectional view of the supporting structure taken along the line X—X in FIG. 14. It should be noted that the heat exchanger tube 12 is fixed to an angle bar 74 by a U-bolt 73, with a supporting member 7 between, and the angle bar 74 is fixed to the LNG vaporizer 1 by an L-shaped fastener 75. The supporting member 7 consists of a heat-insulating cylindrical core 72 having a hole 72a at its center and a protective skin 71 covering the core 72. The core 72 is made of foamed polyurethane resin in this example. The material of the core 72 is not limited to polyurethane resin. The heat-insulating supporting member 7, with the core 72 remaining not frozen, permits the heat exchanger tube 12 to move according as it expands or contracts due to temperature variation in its lengthwise direction, and hence it minimizes thermal stress on the heat exchanger tube 12.

The effect of cooling combustion air for the combined power generation is quantitatively shown in Table 1. The Example is compared with the Comparative Examples (with no air precooling or with air precooling without "cold" storing) for the ratio of LNG to air, the air temperature, the achievable air cooling temperature, the air cooling time, the ratio of actual power output to rated power output, the power output, and the output increase due to air precooling.

TABLE 1

|  | Example With air precooling and "cold" storing | Comparative examples | |
|---|---|---|---|
|  |  | With air precooling, but without "cold" storing | Without air precooling |
| LNG/air ratio (by weight) | 1/50 | 1/50 | 1/50 |
| Atmospheric temperature (°C.) | 37 | 37 | 37 |
| Air temperature that can be achieved by cooling (°C.) | 7.0 | 31.2 | 37.0 |
| Cooling time (h) | 3.6 | 24.0 | — |
| Ratio of output to rating (%) | 100.0 | 89.6 | 87.0 |
| Output (MW) | 115 | 103 | 100 |
| Increase over "no air cooling" (%) | 15 | 3 | — |

It is noted from Table 1 that operating the gas turbine according to the present invention (i.e. by freezing the heat transfer medium with "cold" of LNG, thereby storing "cold" at night, and precooling combustion air with the stored "cold"0 in daytime) increases the output by 15% over operation without air precooling in the Comparative Example or increases the output considerably over comparative operation without "cold" storing but with only heat exchange with LNG. These results prove the excellency of the present invention.

Figure 16:
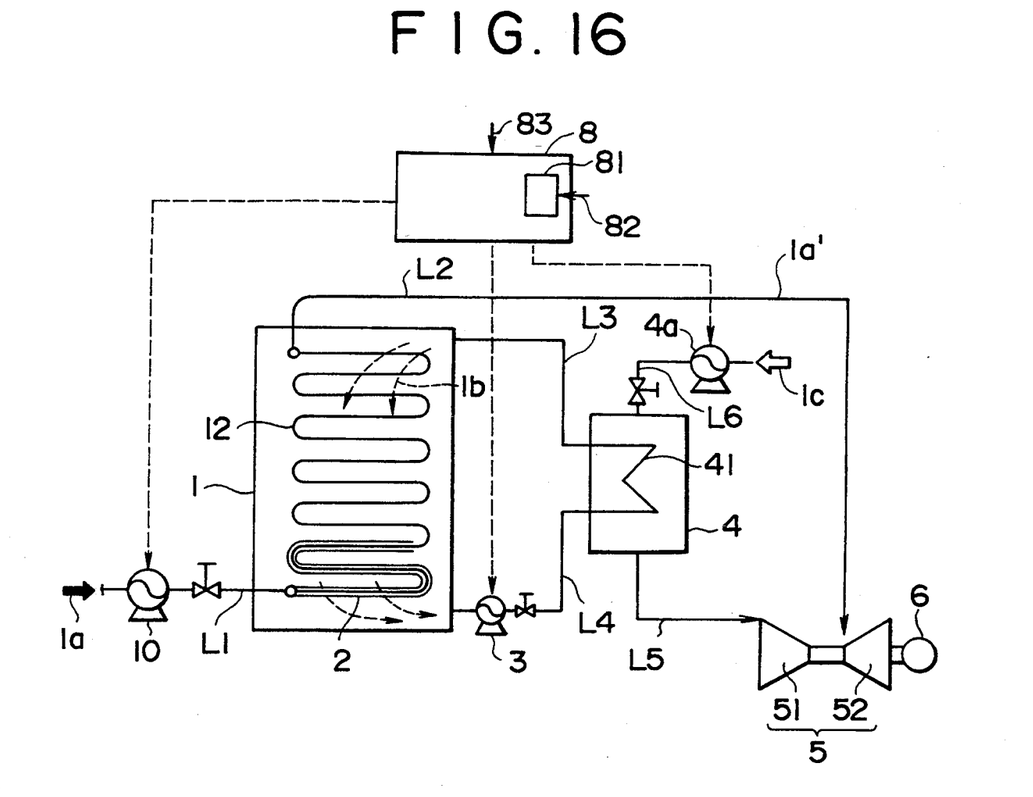
FIG. 16 is a flow sheet designed to explain how to control the operation of the gas turbine mechanism pertaining to the present invention.

The method of firing the gas turbine with liquefied natural gas according to the present invention is explained below with reference to FIG. 16. In FIG. 16, there are shown only those apparatuses (including piping, pumps, and valves, and controller 8 in addition to those shown in FIG. 1) essential for the operation of the gas turbine unit.

There is shown a fuel pump 10 which feeds LNG 1a from the storage tank (not shown) into the heat exchanger tube 12 of the LNG vaporizer through the passage L1. This fuel pump 10 may be replaced by a control valve in the case of a system designed such that LNG 1a is forced into the LNG vaporizer 1 only by the pressure and head of LNG.

There is shown a suction pump 4a in the passage L4 which introduces combustion air into the air precooler 4. There is also shown a circulating pump 3 in the passage L4 which discharges the heat transfer medium 1b from the LNG vaporizer 1.

The controller 8 is a computer to perform control according to the preloaded control program on the fuel pump 10, circulating pump 3, suction pump 4a, and other control valves. The controller 8 is provided with a timer 81 which tells when to switch the mode of operation in daytime and at night. For example, the timer 81 will be set (by the time scheduling information 82) such that the daytime operation lasts for 6.5 hours, starting at 11:00 and ending at 17:30, and the night operation starts at 17:30 and ends at 6:30. The controller 8 will be given the flow rate setting information 83 so that the adequate flow rates of LNG 1a, heat transfer medium 1b, and air 1c are established in daytime and at night. According to the information entered, the controller 8 issues signals to control the flow rates of the LNG 1a, heat transfer medium 1b, and air 1c and to start or stop the fuel pump 10, circulating pump 3, and suction pump 4a. The operation method of the present invention is designed such that the circulation pump 3 is shut down at night so that the heat transfer medium 1b freezes on the surface of the heat exchanger tubes 12 in the LNG vaporizer. The circulating pump 3 is properly controlled according to operation in daytime and at night.

[Effect of the invention]

The present invention provides a method for firing a gas turbine with liquefied natural gas. This method comprises supplying liquefied natural gas through a heat exchanger tube in said LNG vaporizer, thereby gasifying the liquefied natural gas by heat exchange with a heat transfer medium recycled through the LNG vaporizer and air precooler, and cooling the air in the air precooler by heat exchange with the heat transfer medium cooled by the liquefied natural gas when the turbine load is high, and suspending the recycling of the heat transfer medium through the LNG vaporizer and air precooler, thereby causing the heat transfer medium to freeze on the outside of the heat exchanger tubes (for the storing of freezing latent heat) by the "cold" of the liquefied natural gas supplied, when the turbine load is low, and using the freezing latent heat (stored by the freezing of the heat transfer medium) as a "cold" source to cool air through the heat transfer medium, when the turbine load is high.

According to this method, the storing of "cold" by the freezing of the heat transfer medium takes place on the surface of the heat exchanger tubes through which liquefied natural gas is transferred. This permits the heat transfer medium to effectively freeze with a minimum of "cold" loss. Thus, the "cold" possessed by liquefied natural gas is efficiently preserved in the form of freezing latent heat through the freezing of the heat transfer medium on the surface of the heat exchanger tubes. This provides a larger "cold" storing capacity than the conventional method which resorts to the heat capacity of the heat accumulating material. The stored "cold" can be used to precool combustion air when the turbine load is high. This leads to the efficient operation of the gas turbine regardless of load variation in daytime and at night.

The heat transfer medium may be water, in which case water continues to circulate even when it is frozen on the surface of the heat exchanger tubes and the circulating water (which is higher than 0° C.) does not cause frosting in the air precooler. This is desirable for the maintenance of the apparatus.

The present invention also provides an improved mechanism for firing a gas turbine with liquefied natural gas. The mechanism has an LNG vaporizer to gasify liquefied natural gas, an air precooler to cool combustion air by heat exchange, and a turbine unit which is driven by combustion of the gasified natural gas and precooled air. The improvement of the mechanism is characterized in that the LNG vaporizer is provided with heat exchanger tubes through which liquefied natural gas passes, and the LNG vaporizer and air precooler are connected by a passage through which the heat transfer medium is circulated, so that the liquefied natural gas introduced into the heat exchanger tube is heated by heat exchange with the heat transfer medium and the air introduced into the air precooler is cooled. The heat exchanger tubes are provided at their upstream with heat insulation.

The liquefied natural gas introduced into the heat exchanger tubes experiences heat exchange with the heat transfer medium flowing outside the heat exchanger tubes. As the result, the liquefied natural gas gasifies and the heat transfer medium cools and partly freezes on the heat exchanger tubes provided with heat insulation. The heat insulation prevents the icing on the upstream part of the heat exchanger tubes which is most liable to icing.

In other words, the heat insulation makes the icing uniform on the entire surface of the heat exchanger tubes. This prevents the situation in which the space between the heat exchanger tubes is clogged with local excess icing, as in the conventional case. Thus the heat transfer medium always flows through the space between the heat exchanger tubes. This makes it possible to reduce more the intervals between the heat exchanger tubes than in the conventional case. This in turn contributes to the reduction of apparatus size and construction cost.

The uniform icing without excess local icing on the heat exchanger tubes leads to an overall increased icing capacity. The consequence is that it is possible to form ice on the heat exchanger tube without circulating the heat transfer medium when less power generation is required at night and it is possible to utilize the latent heat of the ice by circulating the heat transfer medium when more power generation is required in daytime. In this way it is possible to increase the air cooling capacity of the heat transfer medium. As the result, it is possible to increase the amount of air to be supplied to the turbine and hence to increase the turbine output and power generation. This is desirable to meet the peak demand for power generation.

The heat insulation with polytetrafluoroethylene coating film effectively reduces icing on the heat exchanger tubes. It is inexpensive and easy to apply.

The heat insulation by the double-tube structure consisting of an inner tube and outer tube at the upstream of the heat exchanger tubes produces a good heat insulating effect if the space between the inner and outer tubes is sealed airtightly.

Also, the heat insulation by the double-tube structure consisting of an inner tube and outer tube at the upstream of the heat exchanger tubes produces a good heat insulating effect if it is constructed such that the space between the inner and outer tubes communicates with the inner tube at the upstream. The space holds liquefied natural gas, which is gasified by heat from the heat transfer medium, and the gasified natural gas functions as an effective heat insulator.

The heat exchanger tubes may be arranged upward zigzag in the LNG vaporizer, with their intervals decreasing in going upward in proportion to the thickness of ice. Such arrangement permits the adequate space for the heat transfer medium to be formed in the lower part of the heat exchanger tubes where much ice is formed. The narrower upper intervals reduce the size of the LNG vaporizer, which leads to the reduction of installation cost. The zigzag arrangement permits the heat transfer medium to freeze without the necessity of forming the heat insulation near the base part of the heat exchanger tubes. The ice can be used as a means to store "cold".

Supporting the heat exchanger tubes by heat-insulating members in the LNG vaporizer permits them to expand or contract in their lengthwise direction due to temperature change, because there is no freezing and sticking between the support and the tubes. Thus, the heat exchanger tubes are secured in the LNG vaporizer.

What is claimed is:

1. An apparatus for firing a gas turbine with liquefied natural gas, the apparatus comprising:
   (I) an LNG vaporizer having heat exchange tubes positioned therein, said LNG vaporizer including an LNG vaporizer heat transfer medium inlet and an LNG vaporizer liquefied natural gas inlet, wherein a liquefied natural gas supplied to said LNG vaporizer liquefied natural gas inlet passes through said heat exchange tubes and is gasified by a heat exchange with a heat transfer medium supplied through said LNG vaporizer heat transfer medium inlet, said LNG vaporizer further including an LNG vaporizer gasified natural gas outlet for discharging the gasified natural gas and an LNG vaporizer heat transfer medium outlet for discharging the heat transfer medium cooled by the liquefied natural gas;
   (II) an air precooler for cooling air introduced into said air precooler, said air precooler having an air precooler heat transfer medium inlet;
   (III) a heat transfer medium passage comprising:
      (a) a first passage connected between the LNG vaporizer heat transfer medium outlet and the air precooler heat transfer medium inlet, wherein said air introduced into said air precooler is cooled through a heat exchange between said air and said cooled heat transfer medium supplied to said air precooler through said first passage and said air precooler heat transfer medium inlet; and
      (b) a second passage which connects an air precooler heat transfer medium outlet and said LNG vaporizer heat transfer medium inlet; and
   (IV) means for opening and closing said heat transfer medium passage;
   wherein:
   a portion of said heat exchange tubes on a first side of said LNG vaporizer where the LNG vaporizer natural gas inlet is positioned is provided with an insulation to permit an ice formation level on said insulated portion of said heat exchange tubes caused by a cold transfer between said liquefied natural gas in said heat exchange tubes and said heat transfer medium to decrease and thereby approach an ice formation level on an uninsulated portion of said heat exchange tubes.

2. An apparatus for firing a gas turbine with liquefied natural gas as defined in claim 1, wherein the heat transfer medium is water.

3. An apparatus for firing a gas turbine with liquefied natural gas as defined in claim 1, wherein the heat insulation is a polytetrafluoroethylene coating film formed on the heat exchange tubes.

4. The mechanism for firing a gas turbine with liquefied natural gas as defined in claim 1, wherein the heat insulation of the heat exchanger tubes is accomplished by double-tube structure, with the space between the inner and outer tubes sealed airtightly.

5. The mechanism for firing a gas turbine with liquefied natural gas as defined in claim 1, wherein the heat insulation of the heat exchanger tubes is accomplished by double-tube structure, with the space between the inner and outer tubes communicating with the inner tube.

6. An apparatus for firing a gas turbine with liquefied natural gas as defined in claim 1, wherein the LNG vaporizer is one in which the heat exchange tubes are arranged zigzag upward from a bottom of the LNG vaporizer, with zigzag intervals gradually decreasing while going upward in proportion to a thickness of ice formed thereon.

* * * * *